(12) United States Patent
Kato

(10) Patent No.: US 11,869,248 B2
(45) Date of Patent: *Jan. 9, 2024

(54) OBJECT RECOGNITION DEVICE

(71) Applicant: DENSO CORPORATION, Kariya (JP)

(72) Inventor: Kazuki Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,390

(22) Filed: Apr. 7, 2022

(65) Prior Publication Data

US 2022/0230447 A1 Jul. 21, 2022

Related U.S. Application Data

(63) Continuation of application No. PCT/JP2020/037235, filed on Sep. 30, 2020.

(30) Foreign Application Priority Data

Oct. 9, 2019 (JP) ................................. 2019-186310

(51) Int. Cl.
*G06V 20/58* (2022.01)
*G06T 7/13* (2017.01)
*G06V 10/40* (2022.01)

(52) U.S. Cl.
CPC ................ *G06V 20/58* (2022.01); *G06T 7/13* (2017.01); *G06V 10/40* (2022.01); *G06T 2207/30252* (2013.01)

(58) Field of Classification Search
CPC .......... G06V 20/58; G06V 10/40; G06T 7/13; G06T 2207/30252
See application file for complete search history.

(56) References Cited

U.S. PATENT DOCUMENTS

| | | | |
|---|---|---|---|
| 11,467,281 B2 * | 10/2022 | Suzuki | G06V 20/56 |
| 2014/0254884 A1 * | 9/2014 | Elkington | G01V 3/38 |
| | | | 382/109 |
| 2021/0056685 A1 * | 2/2021 | Zhang | G06T 7/194 |

FOREIGN PATENT DOCUMENTS

| | | |
|---|---|---|
| JP | 2005-329779 A | 12/2005 |
| JP | 2017-181488 A | 10/2017 |

* cited by examiner

*Primary Examiner* — Pinalben Patel
(74) *Attorney, Agent, or Firm* — MASCHOFF BRENNAN

(57) ABSTRACT

An object recognition device of the present disclosure divides a reflection intensity image and a background light image acquired from a light sensor into the same number of subregions. The object recognition device calculates a feature amount for partial image data of each of the subregions of the reflection intensity image and partial image data of each of the subregions of the background light image that have been divided. The object recognition device compares the feature amounts calculated for the partial image data of the reflection intensity image and the partial image data of the background light image in the same one of the subregions and selects the feature amount with which an object is more easily recognized as the selected partial image data. The object recognition device recognizes the object based on overall image data configured by the selected partial image data pieces that have been selected.

7 Claims, 5 Drawing Sheets

FIG.2
BACKGROUND LIGHT IMAGE
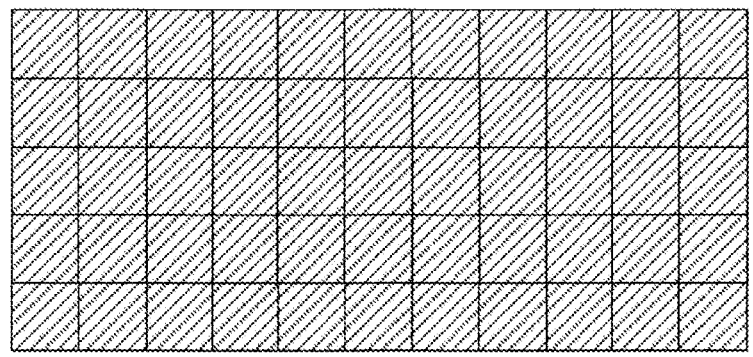
REFLECTION INTENSITY IMAGE 
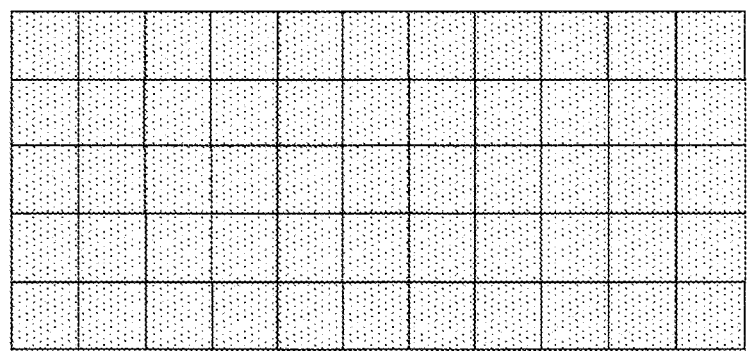
RECONFIGURED IMAGE 
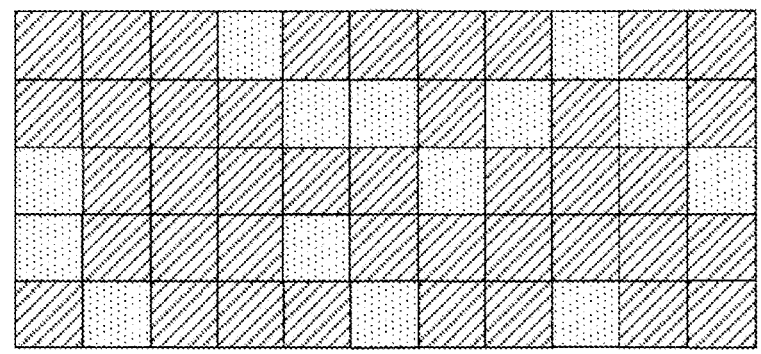

REFLECTION INTENSITY IMAGE

FIG.5
REFLECTION INTENSITY IMAGE
(VEHICLE SPEED: SLOW)
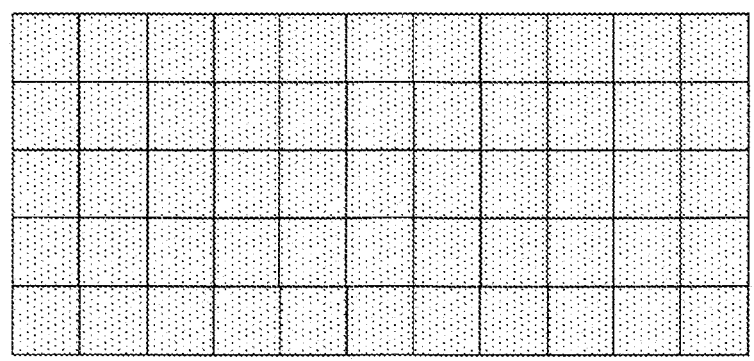
REFLECTION INTENSITY IMAGE
(VEHICLE SPEED: FAST)
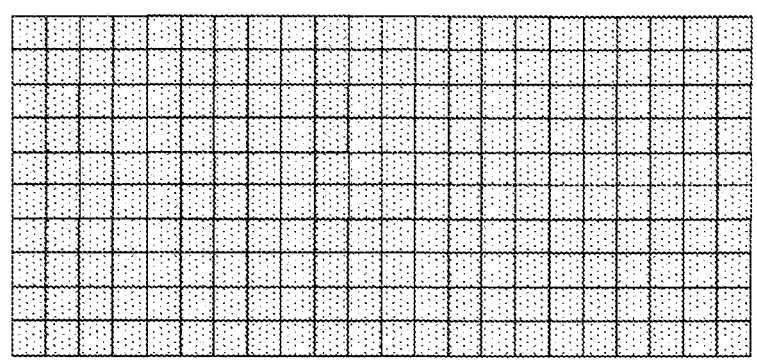

OBJECT RECOGNITION DEVICE

CROSS-REFERENCE TO RELATED APPLICATION

The present application is a continuation application of International Application No. PCT/JP2020/037235, filed on Sep. 30, 2020, which claims priority to Japanese Patent Application No. 2019-186310, filed in Japan on Oct. 9, 2019. The contents of these applications are incorporated herein by reference in their entirety.

BACKGROUND

1. Technical Field

The present disclosure relates to a technique of recognizing an object in a surrounding area by emitting a light beam.

2. Related Art

A technique of recognizing an object in a surrounding area by emitting a light beam is known. For example, this technique emits, at different points in time, a first light beam and a second light beam that differ in at least one of the amount of luminescence and exposure time. A first distance image and a second distance image, which show the distance to an object, are generated in accordance with the phase difference between the first light beam and reflected light of the first light beam and the phase difference between the second light beam and the reflected light of the second light beam.

Furthermore, in this technique, among the received light intensity of the reflected light of the first light beam and the received light intensity of the reflected light of the second light beam, a pixel of the distance image having a higher received light intensity is extracted per pixel from the first distance image and the second distance image, and a composite distance image is generated using the extracted pixels.

SUMMARY

The present disclosure provides an object recognition device. As one aspect of the present disclosure, an object recognition device includes at least an image division section, a feature amount calculation section, a data selection section, and an object recognition section.

The image division section divides a reflection intensity image acquired from a light sensor that receives reflected light from an object when a light beam is emitted to a surrounding area and a background light image acquired from the light sensor when the light sensor does not emit a light beam into the same number of subregions. The feature amount calculation section calculates a feature amount for recognizing the object for partial image data of each of the subregions of the reflection intensity image and partial image data of each of the subregions of the background light image that have been divided by the image division section.

The data selection section compares the feature amounts calculated for the partial image data of the reflection intensity image and the partial image data of the background light image in the same one of the subregions and selects the one with which the object is more easily recognized as the selected partial image data. The object recognition section recognizes the object based on overall image data configured by the selected partial image data pieces that have been selected by the data selection section for the respective subregions.

BRIEF DESCRIPTION OF THE DRAWINGS

In the accompanying drawings:

FIG. 2 is an explanatory diagram illustrating how an overall image data is generated from partial image data pieces of divided subregions;

FIG. 5 is an explanatory diagram illustrating an overall image data in which the size of the subregions is varied in accordance with the vehicle speed.

DETAILED DESCRIPTION OF THE PREFERRED EMBODIMENTS

Figure 1:
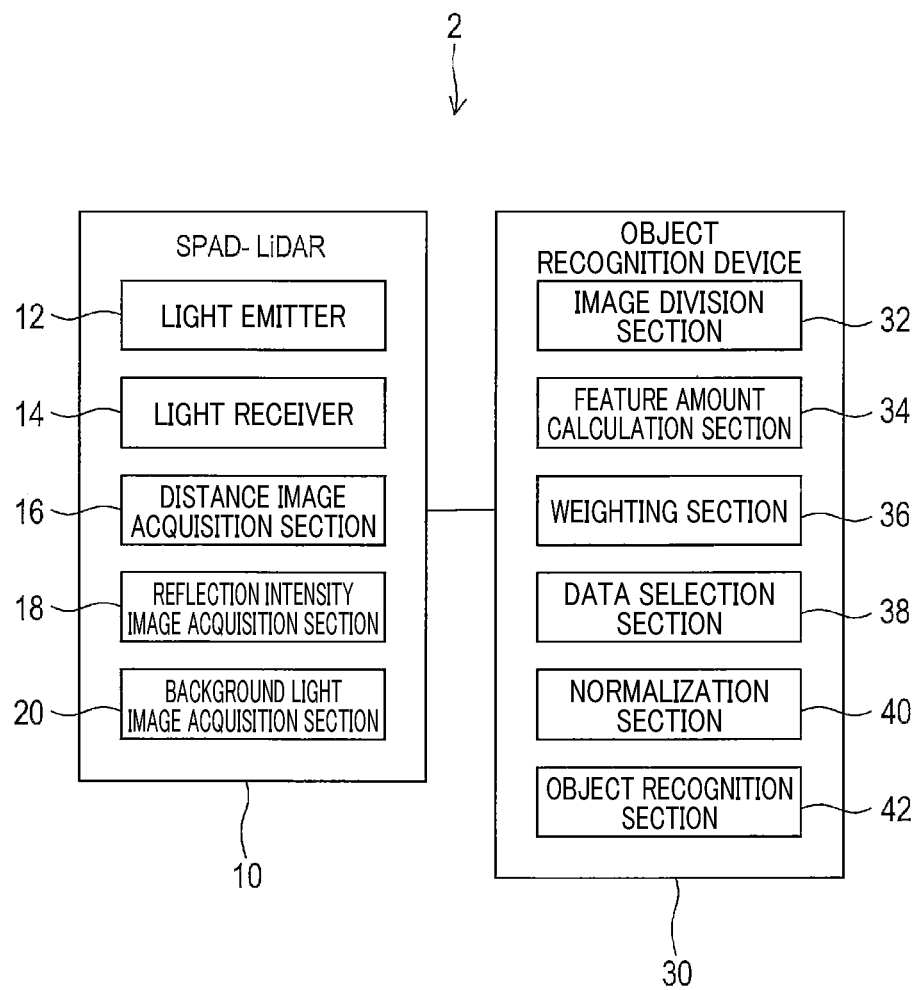
FIG. 1 is a block diagram illustrating the configuration of an object recognition device.

A technique of recognizing an object in a surrounding area by emitting a light beam is known. For example, a technique disclosed in JP 2017-181488 A (published unexamined patent application) emits, at different points in time, a first light beam and a second light beam that differ in at least one of the amount of luminescence and exposure time. A first distance image and a second distance image, which show the distance to an object, are generated in accordance with the phase difference between the first light beam and reflected light of the first light beam and the phase difference between the second light beam and the reflected light of the second light beam.

Furthermore, in the technique disclosed in JP 2017-181488 A, among the received light intensity of the reflected light of the first light beam and the received light intensity of the reflected light of the second light beam, a pixel of the distance image having a higher received light intensity is extracted per pixel from the first distance image and the second distance image, and a composite distance image is generated using the extracted pixels.

In the technique disclosed in JP 2017-181488 A, an object may be recognized based on both the reflected light image of the first light beam and the reflected light image of the second light beam.

Unfortunately, as the result of a detailed examination of the inventor, it was found that executing a recognition process on each of images of two kinds of light obtained from an object, that is, the reflected light image of the first light beam and the reflected light image of the second light beam, increases the processing load.

One or more aspects of the present disclosure desirably provides a technique of minimizing the processing load required to recognize an object in a surrounding area from images of two kinds of light including a reflection intensity image and a background light image.

An object recognition device according to one aspect of the present disclosure includes an image division section, a feature amount calculation section, a data selection section, and an object recognition section.

The image division section divides a reflection intensity image acquired from a light sensor that receives reflected light from an object when a light beam is emitted to a surrounding area and a background light image acquired from the light sensor when the light sensor does not emit a light beam into the same number of subregions. The feature amount calculation section calculates a feature amount for recognizing the object for partial image data of each of the subregions of the reflection intensity image and partial image data of each of the subregions of the background light image that have been divided by the image division section.

The data selection section compares the feature amounts calculated for the partial image data of the reflection intensity image and the partial image data of the background light image in the same one of the subregions and selects the one with which the object is more easily recognized as the selected partial image data. The object recognition section recognizes the object based on overall image data configured by the selected partial image data pieces that have been selected by the data selection section for the respective subregions.

With this configuration, the process executed on images of two kinds of light, which are the overall images of both the reflection intensity image and the background light image, is limited to an extent of from a process for dividing into the subregions to a process for calculating the feature amount.

After the feature amounts of the overall images have been calculated, among the partial image data pieces of the same one of the subregions divided from the overall images, the partial image data having the feature amount with which an object is more easily recognized is selected as the selected partial image data. An object is recognized based on one set of overall image data configured by the selected partial image data pieces that have been selected.

That is, in a case in which a process for calculating the feature amounts of the overall images of the reflection intensity image and the background light image is executed, a process for recognizing an object is executed only on one set of overall image data configured by the selected partial image data pieces. Thus, the processing load required for recognizing an object is minimized.

An embodiment of the present disclosure will hereafter be described with reference to the drawings.

1. Configuration

An object recognition system 2 shown in FIG. 1 includes a SPAD-LiDAR 10 and an object recognition device 30. The SPAD-LiDAR 10 includes a light emitter 12, a light receiver 14, a distance image acquisition section 16, a reflection intensity image acquisition section 18, and a background light image acquisition section 20. The SPAD is an abbreviation of Single Photon Avalanche Diode, and LiDAR is an abbreviation of Light Detection and Range. Hereinafter, the SPAD-LiDAR may simply be referred to as the LiDAR.

The object recognition device 30 includes an image division section 32, a feature amount calculation section 34, a weighting section 36, a data selection section 38, a normalization section 40, and an object recognition section 42.

The light emitter 12 of the LiDAR 10 emits a pulsed laser beam intermittently while scanning in the horizontal direction and the vertical direction in a given direction around a vehicle, for example, a predetermined region ahead in the traveling direction of the vehicle.

The light receiver 14 receives reflected light and background light. The reflected light is reflected from an object when a laser beam emitted from the light emitter 12 is reflected by the object. The background light includes light from a light source, such as sunlight or an illumination lamp, and reflected light that is reflected from an object when light from the light source is reflected by the object while a laser beam is not being emitted.

The light receiver 14 includes two-dimensionally arranged multiple pixels. Each pixel includes multiple light-receiving elements. The light-receiving elements output a light reception signal having a current value corresponding to the intensity of the received light. Each light-receiving element includes, as an avalanche photodiode, a SPAD operated in a Geiger mode. As the light-receiving elements, for example, an avalanche photodiode or a photodiode other than the SPAD may be used.

The distance image acquisition section 16 of the LiDAR 10 acquires the distance to an object for each pixel based on the time from when a laser beam is emitted from the light emitter 12 to when the light receiver 14 receives reflected light.

The reflection intensity image acquisition section 18 acquires the intensity of light received by each pixel when the light receiver 14 receives the reflected light of the laser beam emitted from the light emitter 12 and acquires a reflection intensity image as an overall image.

The background light image acquisition section 20 acquires the intensity of light received by each pixel of the light receiver 14 when the light emitter 12 is not emitting a laser beam and acquires a background light image as the overall image. The light sensor is capable of acquiring the reflection intensity and the background light at the same point in time and in the same range of view. Additionally, in the present embodiment, the intensity of the reflected light and the intensity of the background light are shown in grayscale based on the luminance.

As shown in FIG. 2, the image division section 32 of the object recognition device 30 divides the overall image of the reflection intensity image acquired by the reflection intensity image acquisition section 18 and the overall image of the background light image acquired by the background light image acquisition section 20 into subregions of the same size constituted by the same number of pixels. The number of divisions of the overall image in the horizontal direction and the vertical direction is set as required.

The feature amount calculation section 34 calculates the feature amount for recognizing an object in the partial image data of each of the subregions of the reflection intensity image and the background light image. As the feature amount, for example, the contrast, the detected number of edges, or the detected number of corners is calculated.

Based on the detection result of the illumination sensor, which detects the brightness around the vehicle, the weighting section 36 gives more weight to the feature amount of the partial image data of the reflection intensity image than the feature amount of the partial image data of the background light image as it becomes darker around the vehicle. In contrast, the weighting section 36 gives more weight to the feature amount of the partial image data of the background light image than the feature amount of the partial image data of the reflection intensity image as it becomes brighter around the vehicle.

This is because when it is dark around the vehicle, the intensity of the background light is decreased, and when it is bright around the vehicle, the intensity of the background light is increased.

The data selection section 38 selects the partial image data having the feature amount with which an object is more easily recognized among the feature amounts calculated for the partial image data of the reflection intensity image and the partial image data of the background light image in each subregion and sets it as the selected partial image data of the associated subregion. The phrase the object is easily recognized refers to, for example, a case in which the difference between the brightest section and the darkest section in an image is great, in other words, the ratio between the brightest section and the darkest section is great. That is, the object is easily recognized when the contrast is great.

As shown in FIG. 2, among the feature amounts calculated for the partial image data of the reflection intensity image and the partial image data of the background light image in each subregion, the data selection section 38 selects the partial image data with which an object is more easily recognized and reconfigures overall image data of one frame.

The normalization section 40 normalizes the overall image data that has been reconfigured by the data selection section 38. The normalization section 40 generates, for example, an edge image for each subregion as a partial step of a normalization process performed on the overall image data.

The object recognition section 42 recognizes an object around the vehicle using, for example, an identifier corresponding to the category of the object, such as a person or a vehicle, based on the overall image data normalized by the normalization section 40.

2. Process

Next, an object recognition process executed by the object recognition device 30 will be described using the flowchart of FIG. 3.

Figure 3:
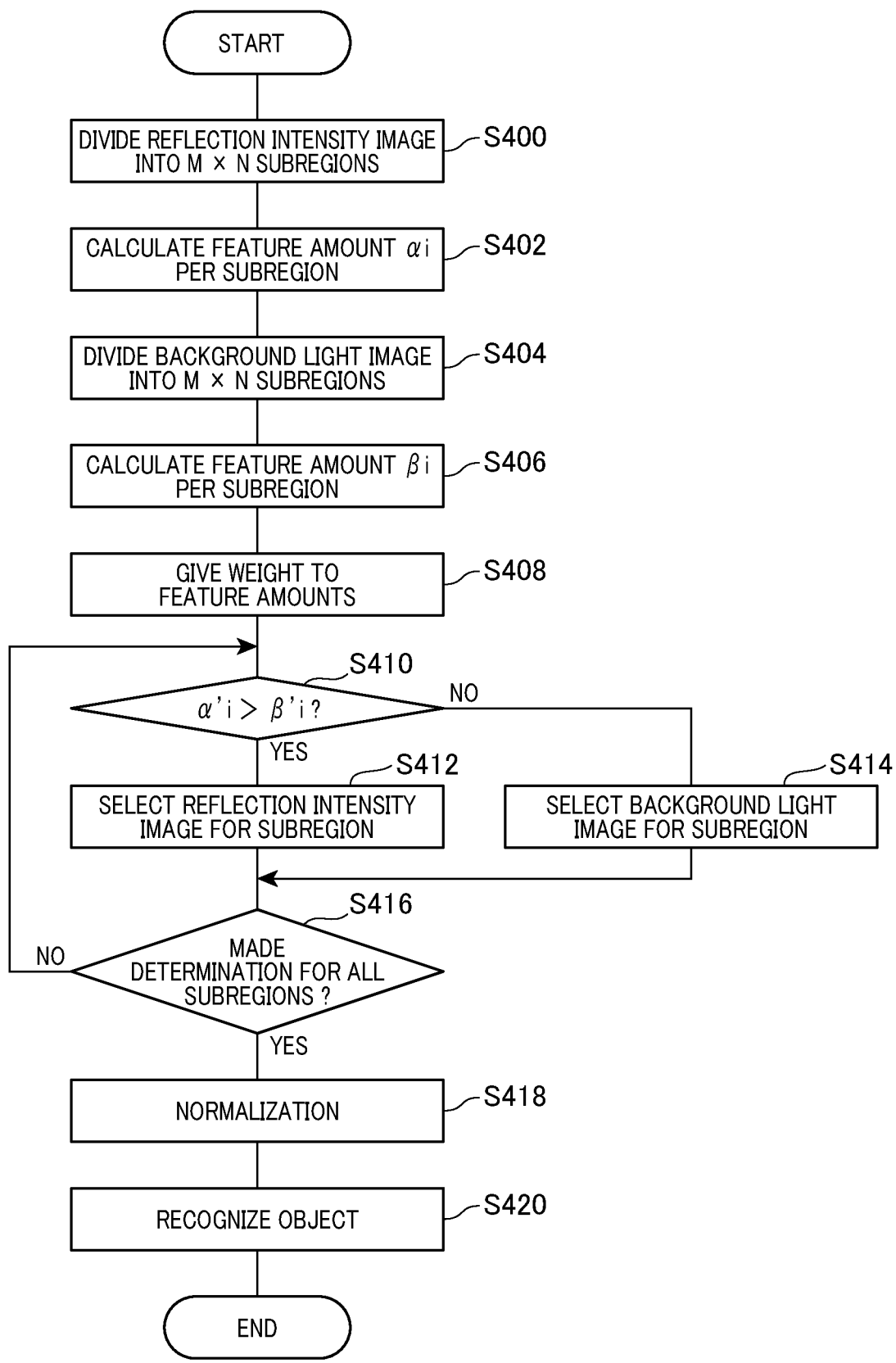
FIG. 3 is a flowchart showing an object recognition process.

At step S400 in FIG. 3, the image division section 32 divides the reflection intensity image into M×N subregions. In this case, the subregions may have the same fixed size or may have different sizes in accordance with the positions of the subregions based on, for example, the traveling environment and the traveling condition.

Figure 4:
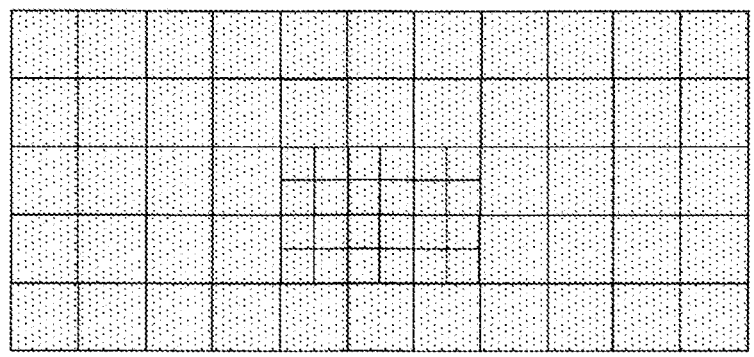
FIG. 4 is an explanatory diagram illustrating an overall image data in which the size of the subregions is varied in the same image.

For example, in the traveling environment in which the vehicle is traveling on an expressway, to improve the accuracy in recognizing a vehicle on a driving lane or an adjacent lane ahead of the vehicle, the size of the subregions in the central section of the image may be set smaller than that of the subregions on the periphery of the image as shown in FIG. 4. Note that, for example, vehicle speed information and GPS information are used to determine the traveling environment. The GPS is an abbreviation of Global Positioning System.

In contrast, depending on the traveling environment and the traveling condition, the size of the subregions on the periphery of the image may be set smaller than that of the subregions at the central section of the image. Setting the size of the subregions is effective during, for example, a right or left turn when it is necessary to detect a pedestrian or the like running out from the left or right side at an early stage. Whether the vehicle is turning right or left is determined based on, for example, indicator information or steering angle information of the subject vehicle.

Furthermore, as the traveling condition, the faster the vehicle speed, the smaller the size of the subregions may be set as shown in FIG. 5.

At step S402, the feature amount calculation section 34 calculates the feature amount αi (i=1, ..., M×N) for recognizing an object for each of the pieces of partial image data of the reflection intensity image divided into M×N subregions.

At step S404, the image division section 32 divides the background light image into M×N subregions. The size of the subregions is set in the same manner as that described for the reflection intensity image.

At step S406, the feature amount calculation section 34 calculates the feature amount Pi (i=1, ..., M×N) for recognizing an object for the partial image data of each subregion of the background light image divided into M×N subregions.

At step S408, the weighting section 36 gives weight to the feature amounts of the partial image data of the reflection intensity image and the partial image data of the background light image based on the brightness around the vehicle as described above. The feature amounts after the weighting process are represented by α'i=w×αi and β'i=y× βi, where w and y are weights.

At step S410, the data selection section 38 determines whether the feature amount α'i of the partial image data of the reflection intensity image is greater than the feature amount β'i of the partial image data of the background light image in an ith subregion. The partial image data with a greater feature amount is determined to be allowing an object to be more easily recognized.

If the decision outcome of step S410 is positive, that is, if the feature amount α'i of the reflection intensity image is greater than the feature amount β'i of the background light image, the process proceeds to step S412. At step S412, the data selection section 38 selects the partial image data of the reflection intensity image as the selected partial image data of the associated subregion.

If the decision outcome of step S410 is negative, that is, if the feature amount β'i of the background light image is greater than or equal to the feature amount α'i of the reflection intensity, the process proceeds to step S414. At step S414, the data selection section 38 selects the partial image data of the background light image as the selected partial image data of the associated subregion.

If the decision outcome of step S416 is positive, that is, when either the partial image data of the reflection intensity image or the partial image data of the background light image is selected as the selected partial image data for all the subregions, and the overall image data of one frame is generated, the process proceeds to step S418. At step S418, the normalization section 40 generates an edge image from the selected partial image data of each subregion and normalizes the selected partial image data. At step S420, the object recognition section 42 recognizes an object based on the overall image data configured by the normalized selected partial image data pieces.

3. Advantages

The above-described embodiment has the following advantages.

(3a) In the object recognition process of recognizing an object near the vehicle based on the reflection intensity image and the background light image, each image is divided into multiple subregions. Among the partial image data of the reflection intensity image and the partial image data of the background light image in each subregion, the partial image data that has the feature amount with which an object is more easily recognized is selected as the selected partial image data of the subregion, and the overall image data is configured by the selected partial image data pieces. An object is recognized based on the thus configured overall image data.

Since there is no need to execute a process for recognizing an object in accordance with both pieces of image data including the reflection strength image and the background light image, the processing load of the object recognition process is minimized.

(3b) Since the overall image data is configured by the normalized selected partial image data pieces, the process for recognizing an object is executed according to the same standards on the overall image data. Thus, an object near the vehicle is easily recognized.

(3c) Since the feature amount of the partial image data of the reflection intensity image and the feature amount of the partial image data of the background light image are weighted based on the brightness around the vehicle, the partial image data appropriate for the brightness around the vehicle is selected from the reflection intensity image and the background light image.

(3d) The size of the subregions into which the image is divided is appropriately set based on the traveling environment or the traveling condition of the vehicle. For example, in accordance with the traveling environment or the traveling condition of the vehicle, the image of the section where you want to recognize an object (a vehicle or a dropped object) with high accuracy such as in front of the vehicle may be divided finey, and the image of the section in the image where there probably is not an object such as the sky may be divided roughly.

In the above-described embodiment, the LiDAR 10 corresponds to the light sensor.

[4. Other Embodiments]

Although the embodiment of the present disclosure has been described, the present disclosure is not limited to the above embodiment and can be modified in various forms.

(4a) In the above-described embodiment, the recognition process performed by the object recognition device 30 mounted on a vehicle is described, but the present disclosure is not limited to this embodiment. For example, the present disclosure may be applied to an object recognition device mounted on a mobile robot or an object recognition device for monitoring located in, for example, a parking lot.

(4b) In the above-described embodiment, the process for recognizing an object is executed after the normalization of the partial image data of the subregions. However, this does not have to be the case, and the process for recognizing an object may be executed without the normalization of the partial image data of the subregions.

(4c) In the above-described embodiment, an edge image was generated in the normalization process. However, this does not have to be the case, and a HOG (Histogram of Oriented Gradients) feature amount or a SIFT (Scale-Invariant Feature Transform) feature amount may be generated. Alternatively, for the selected partial image data of a given subregion, an average value of the contrasts of the surrounding selected partial image data pieces may be calculated, and the luminance of each pixel may be converted to seek that contrast value. The pixels in the vicinity of the boundaries between subregions may be smoothed. This smoothes the boundaries between the subregions of the overall image data.

(4d) In the above-described embodiment, either the reflection intensity image or the background light image was selected as the selected partial image data for each subregion. However, this does not have to be the case. For example, either the feature amount of the reflection intensity image or the feature amount of the background light image, which are calculated for selecting the selected partial image data, may be selected as the selected partial image data.

That is, in a case in which the edge is detected as the feature amount, the edge detection result, that is, the edge image with which an object is determined to be more easily recognized in a given subregion may be selected as the selected partial image data to reconfigure the overall image data. Thus, the process can be omitted when the normalization process is performed in the following step.

(4e) In the above-described embodiment, weight is given to the feature amount of the partial image data of the reflection intensity image and the feature amount of the partial image data of the background light image based on the brightness around the vehicle. However, a process that does not give weight to the feature amount of the partial image data of the reflection intensity image and the feature amount of the partial image data of the background light image may be employed.

(4f) In the above-described embodiment, the illumination sensor was used to detect the surrounding brightness, but this does not have to be the case. For example, the brightness may be detected by determining whether it is day or night based on the time. Alternatively, the average of the contrasts of the entire background light image may be subjected to thresholding. If the contrast is greater than or equal to a threshold value, it may be detected as bright.

(4g) In the above embodiment, the size of the subregions was changed based on, for example, the traveling environment and the traveling condition, but this does not have to be the case. For example, when an object such as a vehicle is recognized in the immediately preceding frame, the subregions may be divided into smaller sizes or more finely for the regions surrounding the region in which the object has been recognized. This improves the accuracy in recognizing the object. The size of the subregions may be changed per frame or multiple frames.

(4h) The object recognition device 30 and the method disclosed in the present disclosure may be achieved by a dedicated computer configured by a processor and a memory, which are programmed to execute one or more functions embodied by computer programs. Alternatively, the object recognition device 30 and the method disclosed in the present disclosure may be achieved by a dedicated computer provided by configuring a processor with one or more dedicated hardware logic circuits. Alternatively, the object recognition device 30 and the method disclosed in the present disclosure may be achieved by one or more dedicated computers configured by combining a processor and a memory programmed to execute one or more functions and a processor configured by one or more hardware logic circuits. The computer program may be stored in a non-transitory, tangible computer-readable storage medium as instructions to be executed by a computer. A method for achieving the functions of sections included in the object recognition device 30 does not necessarily have to include software, and all the functions may be achieved by one or more pieces of hardware.

(4i) In the above-described embodiment, multiple functions of one component may be achieved by multiple components, or one function of one component may be achieved by multiple components. Alternatively, multiple functions of multiple components may be achieved by one component, or one function achieved by multiple components may be achieved by one component. A part of the structure of the above-described embodiment may be omitted. Alternatively, at least a part of the structure of the above-described embodiment may be added to or replaced with the structure of the above-described other embodiments.

(4j) Besides the above-described object recognition device 30, the present disclosure may be achieved in various forms such as a system including the object recognition device 30 as a component, a program that causes a computer to function as the object recognition device 30, a non-transitory tangible storage medium such as a semiconductor memory that stores the program, and the object recognition method.

What is claimed is:

1. An object recognition device comprising:
an image division section configured to divide a reflection intensity image acquired from a light sensor that receives reflected light from an object when a light beam is emitted to a surrounding area and a background light image acquired from the light sensor when the light sensor does not emit a light beam into the same number of subregions;
a feature amount calculation section configured to calculate a feature amount for recognizing the object for partial image data of each of the subregions of the reflection intensity image and partial image data of each of the subregions of the background light image that have been divided by the image division section;
a data selection section configured to compare the feature amounts calculated for the partial image data of the reflection intensity image and the partial image data of the background light image in the same one of the subregions and to select the one with which the object is more easily recognized as the selected partial image data; and
an object recognition section configured to recognize the object based on overall image data configured by the selected partial image data pieces that have been selected by the data selection section for the respective subregions.

2. The object recognition device according to claim 1, wherein:
the feature amount calculation section is configured to calculate contrast, the number of detections of edges, or the number of detections of corners of the partial image data as the feature amount; and
the data selection section is configured to set, either the partial image data of the reflection intensity image or the partial image data of the background light image in each of the subregions that has greater contrast, the greater number of detections of edges, or the greater number of detections of corners as the selected partial image data of the associated subregion.

3. The object recognition device according to claim 1, further comprising
a normalization section configured to normalize the selected partial image data of each subregion selected by the data selection section, wherein
the object recognition section is configured to recognize the object based on the overall image data configured by the selected partial image data pieces of the subregions normalized by the normalization section.

4. The object recognition device according to claim 1, further comprising
a weighting section configured to give more weight to the feature amount of the background light image than the reflection intensity image as the surrounding area becomes brighter and more weight to the feature amount of the reflection intensity image than the background light image as the surrounding area becomes darker, wherein
the data selection section is configured to select the partial image data having the feature amount with which the object is more easily recognized among the feature amount of the reflection intensity image and the feature amount of the background light image of the same subregion that have been given weight by the weighting section and to set it as the selected partial image data of the associated subregion.

5. The object recognition device according to claim 1 mounted on a vehicle, wherein
the image division section is configured to set the size of the subregions based on at least either the traveling environment or the traveling condition of the vehicle.

6. The object recognition device according to claim 1 mounted on a vehicle, wherein
the image division section is configured to set the subregions to different sizes in accordance with the position of the subregions based on at least either the traveling environment or the traveling condition of the vehicle.

7. The object recognition device according to claim 1, wherein
the light sensor includes a light-receiving element including a single-photon avalanche diode.

* * * * *